(12) United States Patent
Breister et al.

(10) Patent No.: US 7,698,116 B2
(45) Date of Patent: Apr. 13, 2010

(54) MANIFOLDS FOR DELIVERING FLUIDS HAVING A DESIRED MASS FLOW PROFILE AND METHODS FOR DESIGNING THE SAME

(75) Inventors: James C. Breister, Oakdale, MN (US); Andrew W. Chen, Woodbury, MN (US); William P. Klinzing, Woodbury, MN (US); Patrick J. Sager, Hastings, MN (US); Douglas C. Sundet, Hudson, WI (US); Matthew S. Linabery, Roseville, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 922 days.

(21) Appl. No.: 11/419,675

(22) Filed: May 22, 2006

(65) Prior Publication Data

US 2006/0265169 A1    Nov. 23, 2006

Related U.S. Application Data

(60) Provisional application No. 60/683,641, filed on May 23, 2005.

(51) Int. Cl.
*G06G 7/50* (2006.01)
*C23C 16/00* (2006.01)
*F26B 3/34* (2006.01)
*F15B 13/00* (2006.01)

(52) U.S. Cl. .................... 703/9; 118/715; 118/719; 118/725; 118/729; 118/730; 427/719; 34/255; 257/200; 137/271

(58) Field of Classification Search .................... 703/1, 703/9; 118/715, 719, 725, 729, 730; 427/719; 34/255; 257/200; 137/271
See application file for complete search history.

(56) References Cited

U.S. PATENT DOCUMENTS

| 4,622,259 | A |   | 11/1986 | McAmish et al. |
| 4,846,102 | A | * | 7/1989  | Ozias ........................... 118/730 |
| 4,854,263 | A | * | 8/1989  | Chang et al. ................. 118/715 |

(Continued)

FOREIGN PATENT DOCUMENTS

| WO | WO 99/32692 | 7/1999 |
| WO | WO 00/22207 | 4/2000 |

OTHER PUBLICATIONS

Mardon et al. "The Design of Manifold Systems for Paper Machine Headboxes", vol. 46 No. 3 Mar. 1963.*
Shambaugh, "A Macroscopic View of the Melt-Blowing Process for Producing Microfibers", *Ind. Eng. Chem. Res.*, 27, (1988), 2363-2372.

(Continued)

*Primary Examiner*—Kamini S Shah
*Assistant Examiner*—Shambhavi Patel
(74) *Attorney, Agent, or Firm*—Douglas B. Little

(57) ABSTRACT

Manifolds are designed to deliver fluid through multiple orifices of the manifold such that for a given inlet fluid pressure the fluid being output from the multiple orifices has a desired mass flow profile. The desired mass flow profile includes a desired mass flow rate and a desired direction and distribution of flow in three-dimensional space. The manifold is first modeled as a two-dimensional representation to determine manifold parameters necessary to achieve the desired mass flow profile within the two dimensions. Then, the manifold is modeled as a three-dimensional representation based on the parameters previously determined for the two-dimensional representation to determine manifold parameters of the third dimension that are necessary to achieve the desired mass flow profile within the three dimensions.

2 Claims, 10 Drawing Sheets

U.S. PATENT DOCUMENTS

| | | | | | |
|---|---|---|---|---|---|
| 5,044,315 | A | * | 9/1991 | Ozias | 427/248.1 |
| 5,244,694 | A | * | 9/1993 | Ozias | 427/248.1 |
| 5,405,446 | A | * | 4/1995 | Nakajima et al. | 118/719 |
| 5,441,568 | A | * | 8/1995 | Cho et al. | 118/715 |
| 5,474,102 | A | * | 12/1995 | Lopez | 137/271 |
| 6,093,252 | A | * | 7/2000 | Wengert et al. | 118/719 |
| 6,143,079 | A | * | 11/2000 | Halpin | 118/715 |
| 6,185,839 | B1 | * | 2/2001 | Kholodenko et al. | 34/255 |
| 6,736,633 | B1 | * | 5/2004 | Dawson-Elli et al. | 431/328 |
| 6,861,025 | B2 | | 3/2005 | Erickson et al. | |
| 6,896,475 | B2 | * | 5/2005 | Graziosi et al. | 415/1 |
| 2001/0054234 | A1 | * | 12/2001 | Asta et al. | 29/890.02 |
| 2002/0000310 | A1 | * | 1/2002 | Cheadle | 165/167 |
| 2003/0006203 | A1 | * | 1/2003 | Romanyszyn et al. | 210/787 |
| 2003/0234464 | A1 | | 12/2003 | Erickson et al. | |
| 2004/0050326 | A1 | * | 3/2004 | Thilderkvist et al. | 118/715 |
| 2005/0087767 | A1 | * | 4/2005 | Fitzgerald et al. | 257/200 |
| 2005/0201896 | A1 | * | 9/2005 | Peck | 422/68.1 |

OTHER PUBLICATIONS

Krutka et al., "Effects of Die Geometry on the Flow Field of the Melt-Blowing Process", *Ind. Eng. Chem. Res.*, 42, (2003), 5541-5553.

Marla et al., "Three-Dimensional Model of the Melt-Blowing Process", *Ind. Eng. Chem. Res.*, 42, (2003), 6993-7005.

Chen et al., "Air drawing of polymers in the melt blowing nonwoven process: mathematical modelling", *Modelling Simul. Mater. Sci. Eng.*, 12, (2004), 381-388.

Marla et al., "Modeling of the Melt Blowing Performance of Slot Dies", *Ind. Eng. Chem. Res.*, 43, (2004), 2789-2797.

Krutka et al., "Effects of Temperature and Geometry on the Flow Field of the Melt Blowing Process", *Ind. Eng. Chem. Res.*, 43, (2004), 4199-4210.

Koestel et al., "The Discharge of Air From a Long Slot", *Heating, Piping & Air Conditioning*, American Society of Heating and Ventilating Engineers Journal Section, Jan. 1948, pp. 153-157.

Koestel et al., "The Control of Air Streams from a Long Slot", *Heating, Piping & Air Conditioning*, The American Society of Heating and Ventilating Engineers Journal Section, Jul. 1951, pp. 111-115.

Senecal, "Fluid Distribution in Process Equipment", Fluid Mechanics in Chemical Engineering, *Industrial and Engineering Chemistry*, vol. 49, No. 6, Jun. 1957, pp. 993-997.

Mardon et al., "The Design of Manifold Systems for Paper Machine Headboxes, Part ll—Taper Flow Manifolds", *Tappi*, vol. 46, No. 3, Mar. 1963, pp. 172-187.

Spengos et al., "Tapered Manifold Flow Spreader", *Tappi*, vol. 46, No. 3, Mar. 1963, pp. 195-200.

Madeley, "The tapered manifold as a flow distributor", *Paper Technology*, vol. 9, No. 1, 1968, pp. 35-39.

Mardon et al., "The Extant State of the Manifold Problem", Technical Paper T346, Pulp and Paper Magazine of Canada, vol. 72, No. 11, Nov. 1971, pp. 76-81.

Trufitt, "Design aspects of manifold-type flow spreaders", *Tappi*, vol. 58, No. 11, Nov. 1975, pp. 144-145.

\* cited by examiner

From D → Fabricate a manifold with the geometrical parameters, install it in the 3-dimensional geometry that needed it with the exits pointed in the dispensing direction, and connect it to the intended supply of fluid. Algorithm ends.

From E → No solution is available within the capacity of the intended supply of fluid. Algorithm ends.

FIG. 9d

MANIFOLDS FOR DELIVERING FLUIDS HAVING A DESIRED MASS FLOW PROFILE AND METHODS FOR DESIGNING THE SAME

CROSS REFERENCE TO RELATED APPLICATION

This application claims the benefit of U.S. Provisional Patent Application No. 60/683,641, filed May 23, 2005.

TECHNICAL FIELD

The present invention is related to manifolds and methods for designing them. More particularly the present invention is related to manifolds and the design thereof providing for a resulting mass flow profile of fluid through orifices as desired for the design.

BACKGROUND

Manifolds are pipes that deliver fluids through outlets that typically outnumber the inlets. Manifolds have multiple orifices distributed along their lengths that serve as fluid exits. The fluid exiting each of the orifices results in a mass flow profile for a given fluid input pressure to the manifold. The mass flow profile includes a mass flow rate and a direction and distribution of fluid flow exiting from the multiple orifices over the elongated length of the manifold.

Different applications of a manifold call for different mass flow profiles to achieve desired results. For example, one application may require a mass flow profile that is substantially consistent over the length of the manifold, i.e., fluid from each orifice having the same mass flow rate and flow direction. Another application might require an increasing, decreasing, or otherwise fluctuating mass flow profile over the length of the manifold and/or may require a direction of flow to be perpendicular or non-perpendicular to the elongated length of the manifold. Accordingly, it is beneficial to design and manufacture manifolds that have a desired mass flow profile or at least provide substantially the same results as the desired mass flow profile is expected to provide.

Designing manifolds having desired mass flow profiles has heretofore been a lengthy and expensive trial and error process whereby a manifold design is assumed to have a given mass flow profile and the manifold is manufactured and tested to find the actual mass flow profile. Only simple one-dimensional modeling has been used and the predictions of the one-dimensional model are only very loosely tied to the other two dimensions of the mass flow profile. The actual mass flow profile of the manufactured manifold deviates from the desired mass flow profile by some degree. Therefore, the manifold design must be modified according to educated guesses, re-manufactured, and then re-tested to determine whether the actual mass flow profile matches the desired mass flow profile. This process repeats until the actual and desired mass flow profiles adequately match.

It is apparent that the conventional manifold design process is overly burdensome in that each design and manufacture iteration is costly. Accordingly, it may be cost prohibitive to require a specific mass flow profile for a manifold design.

SUMMARY

Embodiments of the present invention address these issues and others by utilizing a design process that models the manifold and its mass flow profile in three dimensions so that the manufacture of the manifold design results in an actual mass flow profile that substantially matches or achieve substantially the same results as the desired mass flow profile. Accordingly, the need for multiple iterations of design and manufacture of the manifold is eliminated, thereby saving much of the time and expense otherwise necessary to achieve the results provided by the desired mass flow profile.

One embodiment is a computer-implemented method of designing a manifold for delivering a fluid. The method involves creating a two-dimensional representation of a three-dimensional geometry having a requirement for a manifold that is elongated in the direction perpendicular to the two-dimensional representation, and is adapted for the dispensing of the fluid. The method further involves determining as a primary boundary condition a desirable mass flow profile for the fluid from the manifold based on the two-dimensional representation, specified in terms of an appropriate dispensing direction and an appropriate mass flow rate of the fluid from the manifold. Additionally, the method involves forming a negative model of the three-dimensional geometry, meshing the negative model into hexahedral elements such that at least some of the hexahedral elements are oriented relative to the dispensing direction, determining a set of additional boundary conditions describing the supply of fluid to the manifold and describing a first set of trial geometrical parameters of the exits for the fluid from the manifold, and modeling the flow of the fluid within the meshed negative model to develop a prediction of the mass flow rate and dispensing direction of the fluid from the manifold for the three-dimensional geometry including the distribution of the flow over the elongation of the manifold. If the prediction fails to describe the delivery of the desirable mass flow profile from the manifold with respect to the direction perpendicular to the two-dimensional representation to within a predetermined margin, then the trial geometrical parameters are refined so as to change the ratio of combined outlet area of the manifold to combined inlet area of the manifold. Iterating solving the group of differential equations and refining the trial geometrical parameters to discover the maximum ratio of the combined outlet area to the combined inlet area that permits the prediction to describe the desired mass flow of the compressible fluid from the manifold to within the predetermined margin. Further, the method involves recreating the two-dimensional representation to reflect the final iteration of the trial geometrical parameters and verifying that the desirable mass flow is delivered.

Another embodiment is a computer-implemented method of designing a manifold for delivering a fluid having a desired mass flow profile defining a mass flow rate and dispensing flow direction over its length. The method involves, from a two-dimensional representation of a three-dimensional geometry for the manifold where the manifold is elongated in the direction perpendicular to the two-dimensional representation, determining a slot geometry for a slot appearing within the two-dimensional representation to provide a desired mass flow rate and a desired direction of dispensing flow for the slot for a given inlet pressure to the manifold. The method further involves from a three-dimensional representation of the three-dimensional geometry for the manifold, utilizing the slot size, mass flow rate, and direction of dispensing flow determined from the two-dimensional representation, introducing a slot size within the third dimension, introducing a slot spacing within the third dimension, introducing a total number of slots within the third dimension, introducing the wall thickness of the manifold at the position of the slot, and then determining a mass flow profile over the slots of the third dimension. If the determined mass flow profile does not substantially match the desired mass flow profile, then the method further involves iteratively altering at least one of the slot size within the third dimension, the slot spacing within the third dimension, and the total number of slots within the third dimension, and again determining a mass flow profile over the slots of the third dimension until the mass flow profile does substantially match the desired mass flow profile.

Another embodiment is a manifold for delivering fluid having a desired mass flow profile defining a mass flow rate and dispensing flow direction over its length. The manifold results from creating a two-dimensional representation of a three-dimensional geometry for the manifold where the manifold is elongated in the direction perpendicular to the two-dimensional representation. The manifold further results from the two-dimensional representation, determining a slot geometry for a slot appearing within the two-dimensional representation to provide a desired mass flow rate and a desired direction of dispensing flow for the slot for a given inlet pressure to the manifold. Additionally, the manifold results from creating a three-dimensional representation of the three-dimensional geometry for the manifold and from a three-dimensional representation of the three-dimensional geometry for the manifold, utilizing the slot size, mass flow rate, and direction of dispensing flow determined from the two-dimensional representation, introducing a slot size within the third dimension, introducing a slot spacing within the third dimension, introducing a total number of slots within the third dimension, introducing the wall thickness of the manifold at the position of the slot, and then determining a mass flow profile over the slots of the third dimension. If the determined mass flow profile does not substantially match the desired mass flow profile, then the manifold further results from iteratively altering at least one of the slot size within the third dimension, the slot spacing within the third dimension, and the total number of slots within the third dimension, and again determining a mass flow profile over the slots of the third dimension until the mass flow profile does substantially match the desired mass flow profile.

Another embodiment is a manifold for delivering fluid having a desired mass flow profile defining a mass flow rate and dispensing flow direction over its length. The manifold includes an elongated tube having a length greater than 60 cm. The manifold further includes a series of openings spaced along the length, the series of openings being matched to a given input pressure so as to result in the desired mass flow profile.

DESCRIPTION OF THE DRAWINGS

FIGS. 9A-9D shows a flowchart illustrating an example embodiment of a method of designing a manifold.

DETAILED DESCRIPTION

Embodiments of the present invention provide for manifolds and methods of designing manifolds to provide a desired mass flow profile including a mass flow rate, a direction of flow, and a distribution of the flow over the elongated length of the manifold. Various applications require particular results for which particular mass flow profiles are desired. The embodiments described herein provide for the computer-implemented design of manifolds having such desired mass flow profiles or at least providing for substantially the same results as thought to be provided by the desired mass flow profiles.

While there is an infinite variety of applications and corresponding desired mass flow profiles to consider, illustrative embodiments of the present invention will be described herein in connection with an exemplary practical example that arose in connection with the problem arising in the field of the production of meltblown fabric.

Figure 1:
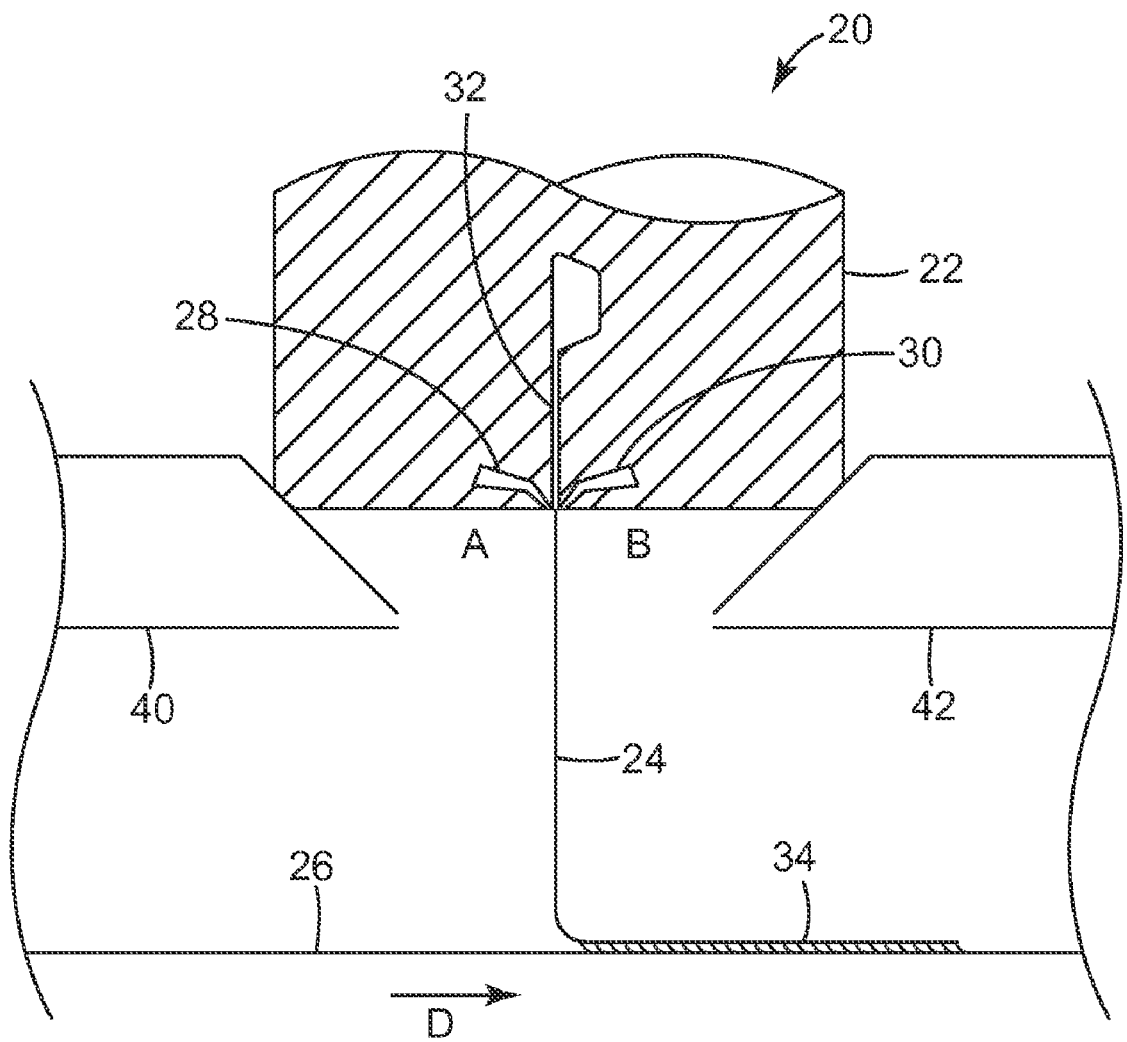
FIG. 1 shows a cross-sectional view of a conventional meltblowing apparatus that has been found to have large recirculation zones when operated above a certain output rate.

Referring now to FIG. 1, the problem arising in the field of production of the meltblown fabric is briefly discussed. A meltblowing apparatus 20 including a meltblowing die 22 is illustrated in a representative cross-section. The meltblowing die 22 is used to expel a stream 24 of extended polymeric filaments towards a collection belt 26 moving in direction "D," is illustrated. According to conventional practice, the meltblowing die 22 is provided with cavities 28 and 30 for directing two streams of heated gas against the stream 24 just after the stream 24 has been extruded from a line of extrusion orifices 32. The heated gas jets emerging from cavities 28 and 30 to extend and thin the filaments emerging from the extrusion orifices 32 so that they have the proper size and dispersion to form the desired fabric 34 upon the collection belt 26. Although a belt is depicted in connection with this example, those acquainted with the meltblowing art will understand that a rotating drum can be used for the purposed of taking off the filaments as fabric.

The meltblowing apparatus 20 further includes a pair of ducts 40 and 42, one upstream and one downstream of the stream 24 compared to the direction "D". Secondary flow is expelled from ducts 40 and 42 against the filament stream 24 so the filaments, when they impinge upon the collection belt 26, have the properties desired in the fabric 34.

The foregoing description generally follows the disclosure of U.S. Pat. No. 6,861,025 to Breister et al, and is adequate for the production of meltblown fabrics at low and moderate speeds of collection belt 26. However, as the process is run harder and faster, e.g. after the production of fabric exceeds approximately 35 g/hour/hole, difficulties arise in the form of erratic motion imparted to some of the emerging filaments. At higher extrusion rates, the orderly accumulation of filaments upon collection belt 26 becomes disrupted, and some filaments begin to collect upon the surface of die 22 and on the ducts 40 and 42. This observation suggests that paired areas of recirculation, taking the form of standing vortices had formed roughly at the positions marked A and B.

In that it is desirable to be able to increase line speed while maintaining the desirable properties of the fabric 34, and in that disrupting the posited recirculation zones A and B seem likely to be amenable to solution by a gas-dispensing manifold that is elongated in the direction perpendicular to the two-dimensional representation of FIG. 1.

Figure 2:
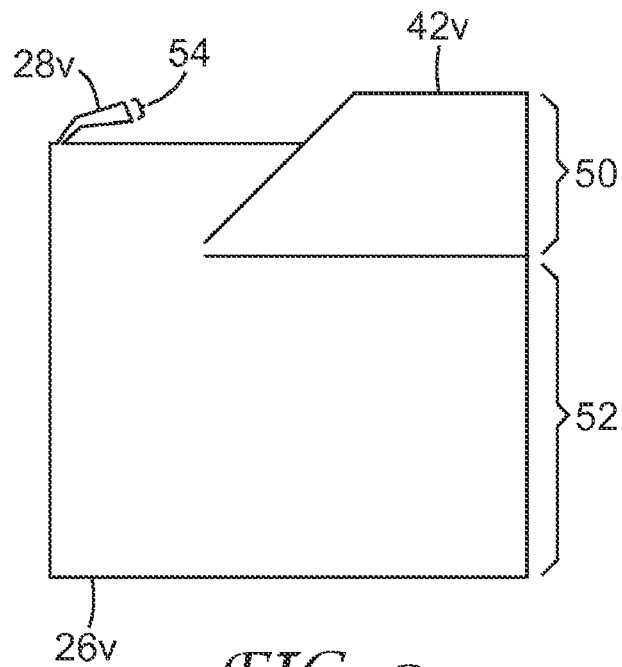
FIG. 2 shows a two-dimensional geometrical representation of a cross-section of a meltblowing apparatus utilized in designing an auxiliary manifold that has a mass flow profile necessary to isolate the recirculation zones.

An initial geometrical representation was set up according to FIG. 2. A simplifying assumption was made that the problem was symmetrical in spite of the recognized complication that the collection belt (26 in FIG. 1) is in motion and does generate some fluid motion by the no-slip condition. The existing geometry of the cavity (28 in FIG. 1), the duct (42 in FIG. 1) and collection belt (26 in FIG. 1), are represented virtually as geometric representations 28$v$, 42$v$, and 26$v$, respectively. Boundary conditions are set as being the known gas pressures that provide the best, albeit inadequate, operating conditions when collection belt 26 is operated at high line speed. In the geometrical representation, those pressures are assumed to exist uniformly along lines 50, 52, and 54.

Figure 3:
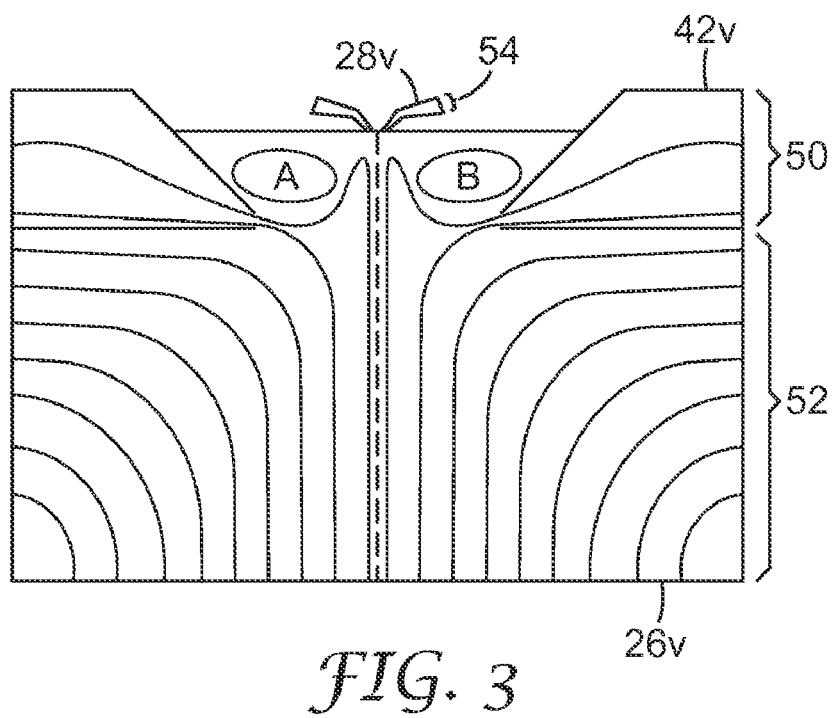
FIG. 3 shows the geometrical representation of FIG. 2 after having been meshed into finite elements allowing for modeling of streamlines to be utilized in designing the auxiliary manifold.

This two-dimensional geometry and these boundary conditions are provided to a commercially available flow analysis package to determine the presence of the recirculation zones in preparation for adding an auxiliary manifold and determining what the desired mass profile should be to adequately isolate the recirculation zones. Although a number of commercial offerings are considered suitable, the FLUENT solver, commercially available from Fluent, Inc. of Lebanon, N.H., may be used. The k-epsilon two-equation model is selected for this problem, and the use of renormalized groups is enabled. The function taking viscous heating of the gas is also enabled. Once the described geometry and boundary conditions are in place, and the space defined in FIG. 2 has been meshed into finite elements, the solver is run in a manner so as to visualize the streamlines representing gas flow after an equilibrium condition has established itself. These streamlines are illustrated in FIG. 3. In this figure, the hypothesis that recirculation zones at A and B are formed is strengthened by the appearance of the closed streamlines around those locations.

Figure 4:
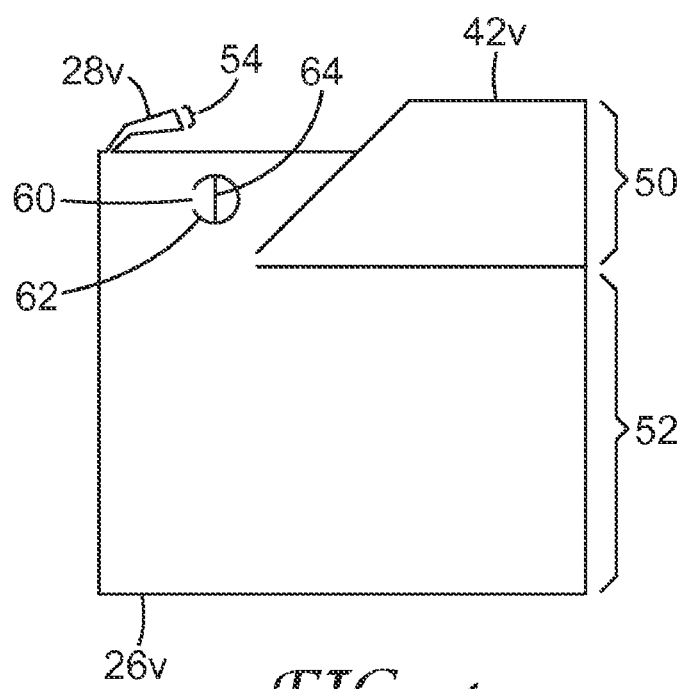
FIG. 4 shows the geometrical representation of FIG. 2 after having an auxiliary manifold added.

In this example, it is believed that the recirculation zones may be disrupted by an additional flow of gas emerging from an aperture 60 in a new manifold 62 as shown in FIG. 4. As is true for the rest of the geometry, the gas-dispensing manifold 62 is posited to be elongated in the direction perpendicular to the two-dimensional representation of FIG. 1, and that any given cross-section is representative of the flow at any other cross-section taken along that perpendicular. For simplicity, a boundary condition line 64 is established within the manifold 62, at this stage it is presumed that a uniform pressure can be maintained uniformly along line 64 at every possible cross-section. Later in the design process, this simplifying assumption may be verified and addressed as necessary.

As a starting point for this particular example, it is assumed that the mass flow emerging from manifold 62 to disrupt the recirculation zones should be 50% of the mass flow known to be needed from the duct 42 in order to achieve the needed treatment of the filaments at the desired production rate (over 35 g/hour/hole being sought). As another starting point, the pressure along boundary condition line 64 is arbitrarily set at some reasonable value, such as 20 psig total, merely from being a reasonable fraction of the static pressure capacity of a readily available compressor. A starting size for aperture 60 is derived by simple orifice equations from the assumed mass flow needed from manifold 62 at the assumed pressure within manifold 62.

Figure 5:
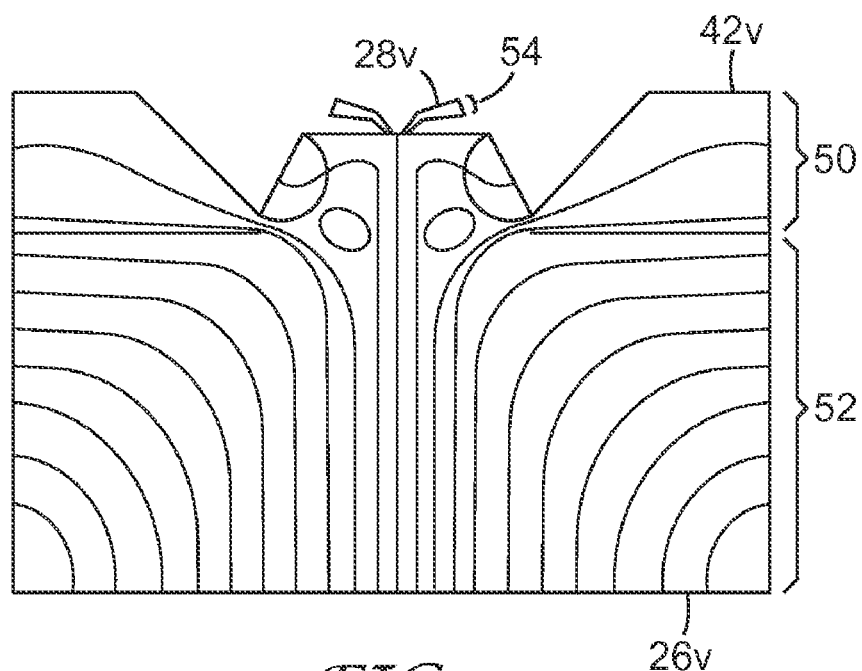
FIG. 5 shows the geometrical representation of FIG. 4 after having been meshed into finite elements allowing for modeling of streamlines that result from the introduction of the auxiliary manifold.

With these assumptions in place, the solver is again employed to analyze the new geometry and boundary conditions. For this example, a number of trials may be run varying the position of aperture 60 around the circumference of manifold 62. Analysis of the streamlines produced by the trials suggested that best results would be achieved not by aiming the outflow from manifold 62 at the center of recirculation zone B, but in front of it so as to create a curtainwall of moving gas to isolate the emerging filaments from the recirculation zone. This condition is illustrated in FIG. 5, and at this point it can be said that a dispensing direction has been determined for the manifold 62 to go along with the mass flow rate previously assumed for the given input pressure. It is further assumed for this example that the distribution of flow over the elongated length of the manifold in the third dimension should be uniform to properly isolate the recirculation zones.

Once the best direction for aiming the outflow of manifold 62 are determined for this particular example, an additional group of trials with the solver are performed in order to determine whether the assumed mass flow from manifold 62 can be reduced while still maintaining isolation of the recirculation zones in order to save energy costs in providing that flow. In these experiments for this particular example, it has been found that the mass flow may be reduced to 30% of the mass flow emerging from the duct before the flow from the manifold can no longer isolate the stream of filaments 24 from the recirculation zone.

Figure 6:
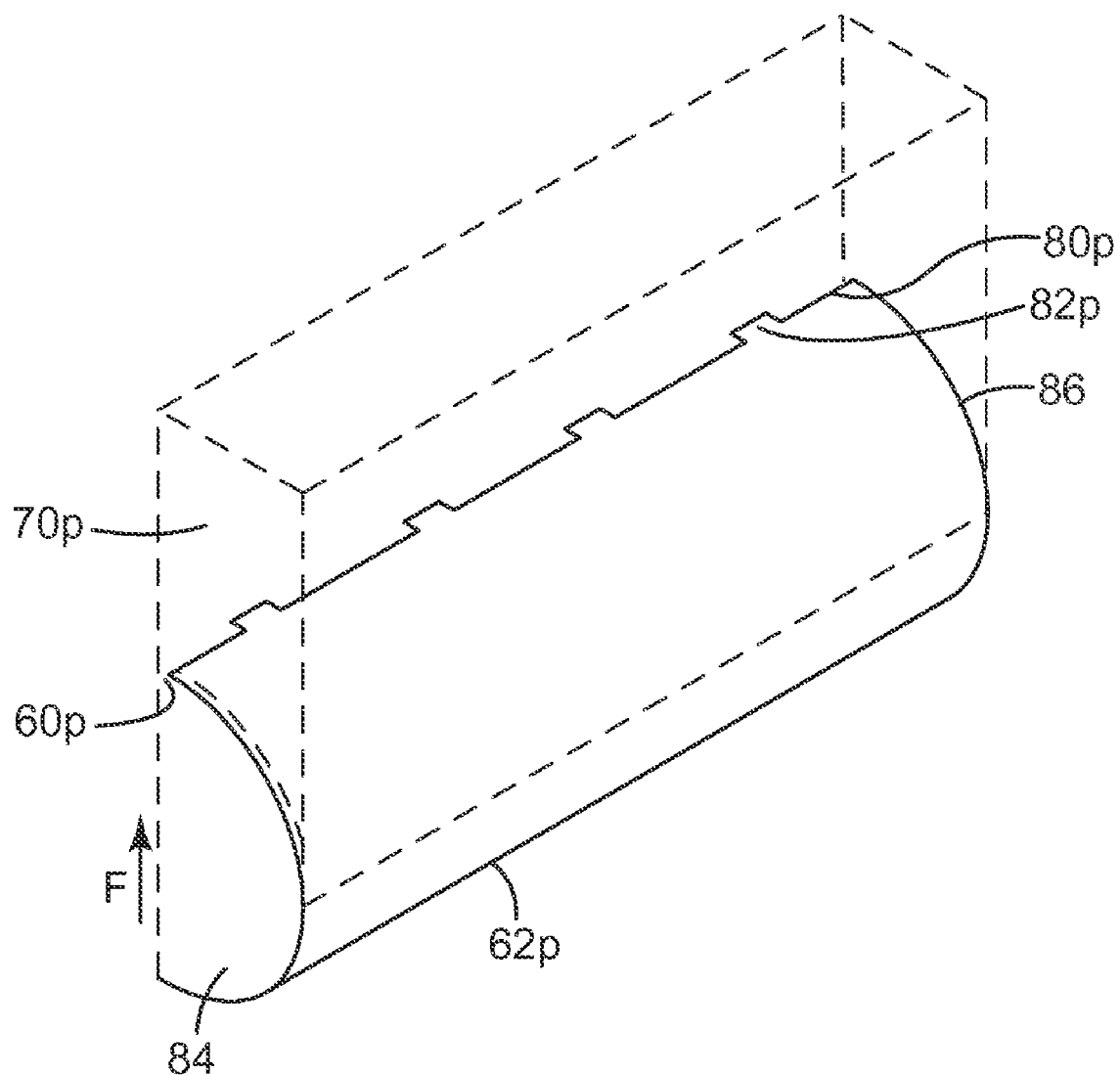
FIG. 6 shows a three-dimensional geometrical representation of the auxiliary manifold having the conditions defined by the two-dimensional geometrical representation of meshed elements shown in FIG. 5.

By this point, a viable solution to the practical problem needing resolution has been achieved, i.e., the desired mass flow profile, provided it turns out to be possible to provide the identified mass flow uniformly along the elongated length of the manifold 62 in the direction perpendicular to the two-dimensional representation. The previously made simplifying assumption that this would turn out to be possible still must be verified. In order to carry out this challenge, a 3-D mathematical representation of the gas inside the manifold 62 and in its immediate environs is created. In this representation, the geometry of the manifold 62$p$ is essentially inverse, defining a boundary across which the gas cannot flow. This geometrical representation is illustrated in FIG. 6. In this Figure, one-half of manifold 62 has been converted to this virtual representation 62$p$, because the simplifying assumption has been made that the situation is symmetrical. Also included in the representation is the solution domain of the exhausted gas emanating from the virtual representation of the manifold 62$p$. Although it may not be intuitively obvious that the volume of gas adjacent to the outside surface of manifold 62$p$ so far around the circumference from the slots 80$p$ need to be included in the 3-D mathematical representation, intuition is incorrect. Not including this seemingly extra volume in the 3-D mathematical representation often causes invalid results.

The representation of the manifold 62$p$ may be designed while recognizing that it may be necessary to increase structural strength by providing the aperture 60$p$ as a series of slots 80$p$ separated by bridges 82$p$. In the instant description, a cylindrical tube of 51 mm in outside diameter, 45 mm inside diameter, and 188 cm long (a relatively lengthy manifold compared to the trial and error manifolds of the prior art that are typically much shorter than 60 cm) was selected as a starting point for manifold 62 by reason of such a size being conveniently positionable in the meltblowing apparatus 20. As a starting point for the analysis for this particular example, it was assumed that the tube would be provided with slots 38 mm long and 3.2 mm wide, separated one from the next by 3.2 mm by bridges in accordance with the orifices of the meltblowing apparatus of interest.

The gas volume within and adjacent to the exterior of the inverse representation of the manifold 62*p* is then meshed into finite hexahedral elements such that at least some of the hexahedral elements are oriented relative to the dispensing direction, depicted as "F" in this Figure. As a boundary condition, the manifold 62*p* is assumed to be filled from one end 84, or both ends 84 and 86. More specifically, the mass flow per unit length in, e.g. kg/sec/m that provided isolation of the recirculation zones in the 2D representation is multiplied by the length of the manifold 62*p*. Then the entry of one half of that total mass flow (because the assumption is being made that the other half to the total mass flow is being handled by the symmetrical other half of the manifold) into the representation through the surface of end 84, or end 84 and end 86, is set as a boundary condition.

Figure 7:
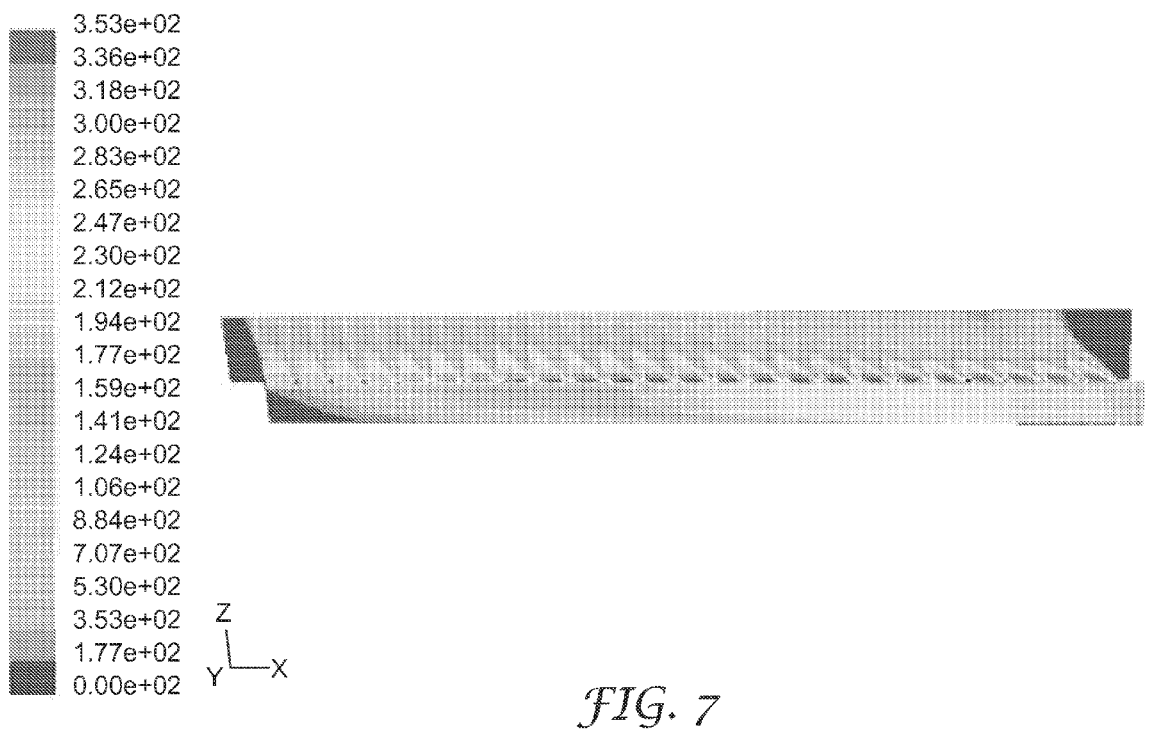
FIG. 7 shows the distribution of mass flow and direction over the third dimension of the auxiliary manifold after an initial attempt of design within the geometrical representation of FIG. 6 that has resulted in a non-uniform distribution and non-perpendicular direction of flow.

This three-dimensional geometry and these boundary conditions are provided again to the FLUENT solver, and once again the k-epsilon two-equation model is employed. Also, the use of renormalized groups, and (because the fluid in the instant example is compressible air) the function taking viscous heating of the gas into account are also enabled. The solver is then run so as to provide the vector and the magnitude of the velocity of the fluid at various points. This vector field was used to prepare a false color visualization of the velocity of the fluid passing through each slot in the dispensing direction, so as to by derivation provide an indication of the actual distribution of mass flow over the elongated length of the manifold. This is illustrated as FIG. 7, where the gas is entering the manifold from one end in flow direction "F". It can be observed from the Figure that the flow is not uniform along the elongated length of the manifold such that the trial geometrical parameters have failed to yield the desired mass flow profile.

According to embodiments of the present invention, if an analysis of these trial geometrical parameters of slot length, slot width, slot spacing, manifold diameter, etc., fails to describe the delivery of the needed mass flow from the manifold in a fashion sufficiently the same as is desired, it is needful to refine these geometrical parameters, and rerun the analysis. It has been found that reducing the ratio of the combined outlet area to the combined inlet area tends to make the flow more uniformly distributed, should uniform flow over the elongated length of the manifold be desired for a particular application. In the present example, when the visualization of FIG. 7 demonstrates that the flow from the 6.4 mm wide slots was insufficiently uniform, the geometrical parameters of the 3-D model are adjusted to 1.59 mm wide and the model is once again put to the solver. The solver is again run so as to provide a visualization of the velocity of the fluid passing through each of these narrower slots in the dispensing direction. This is illustrated as FIG. 8, and it can be observed from the Figure that the velocity, and by derivation the mass flow profile, has a much more uniform distribution of flow along the elongated length of the manifold than was the case in FIG. 7. For this particular example, the uniformity of the flow profile is considered to be sufficiently good to generate an even curtainwall of gas flow to isolate the filaments from the recirculation zones across an entire production web.

Figure 8:
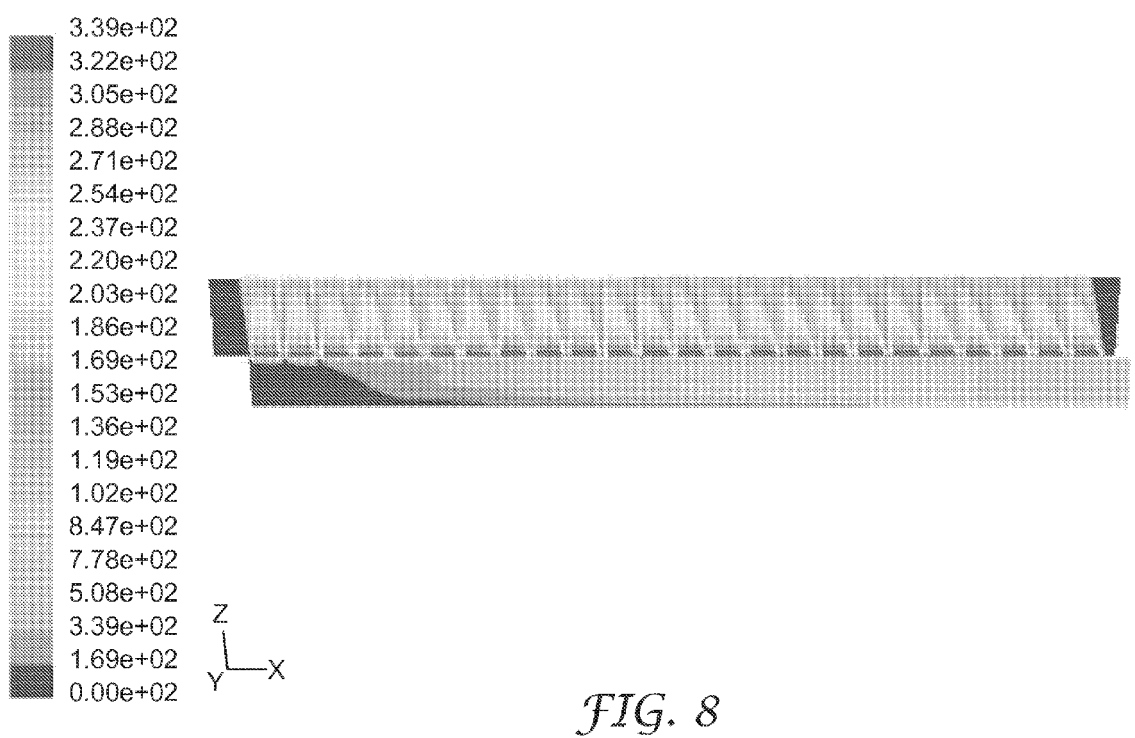
FIG. 8 shows the distribution of mass flow and direction over the third dimension of the auxiliary manifold after a subsequent attempt of design within the geometrical representation of FIG. 6 that has resulted in a substantially uniform distribution and a substantially perpendicular direction of flow.
Figure 9A:
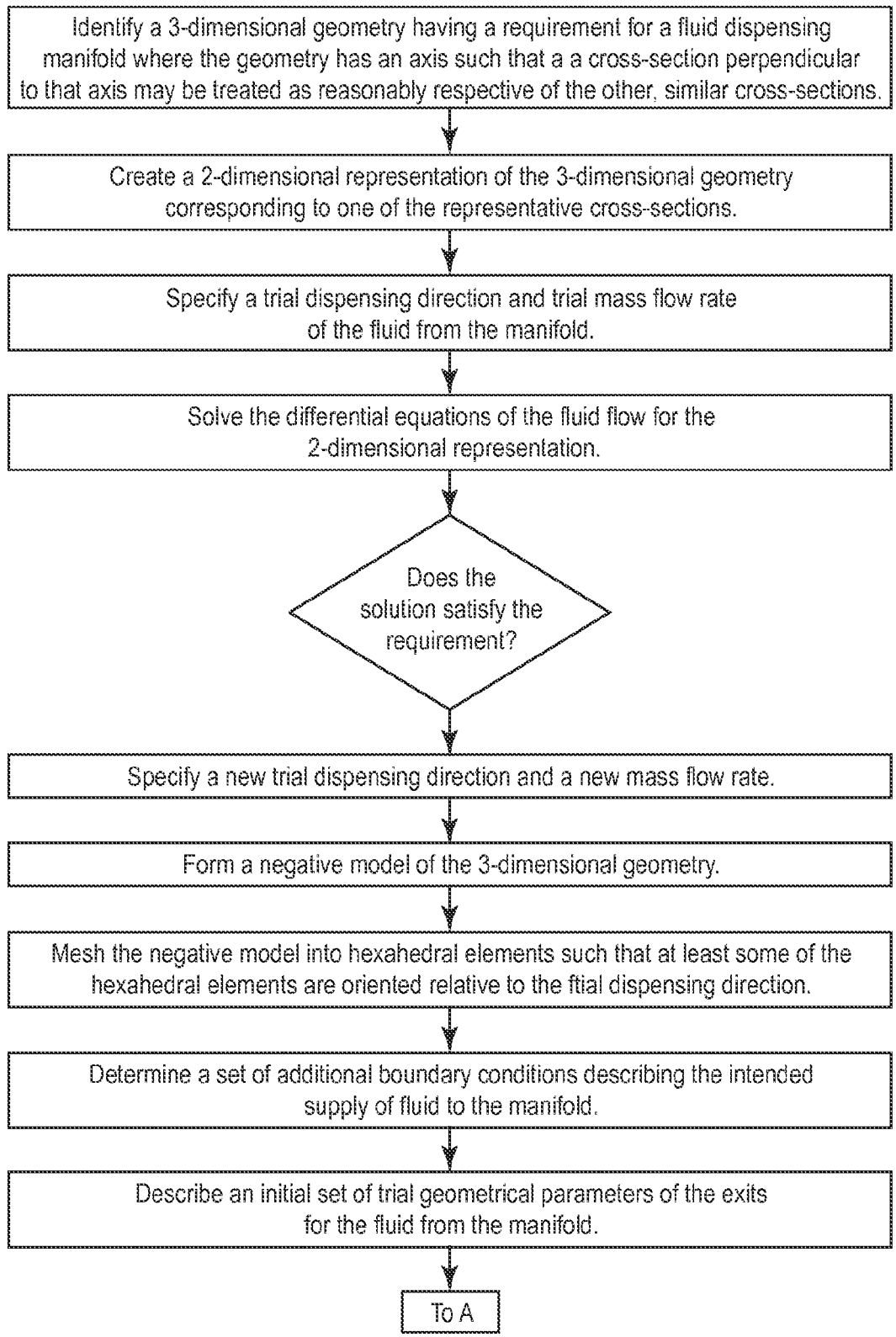
Figure 9B:
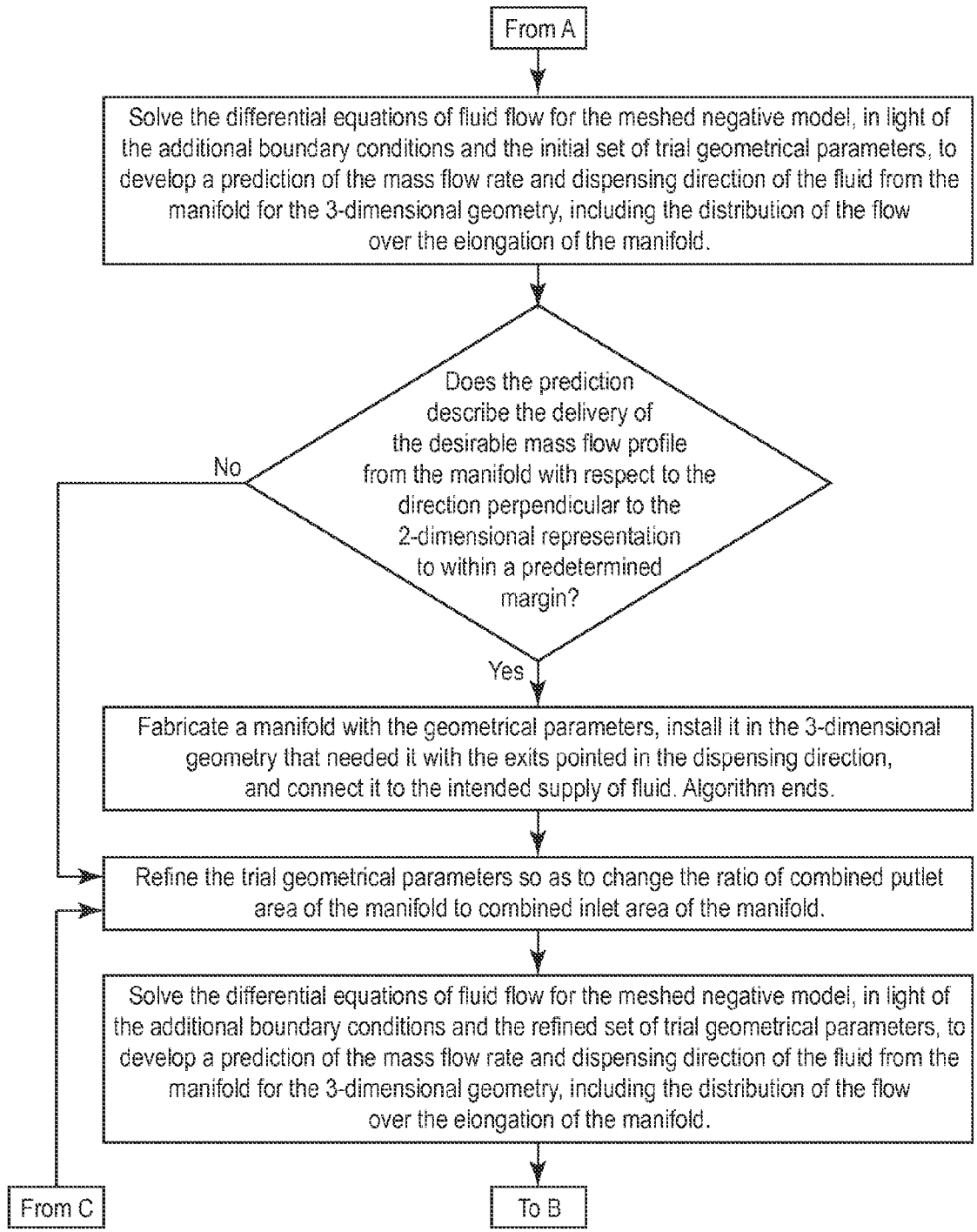
Figure 9C:
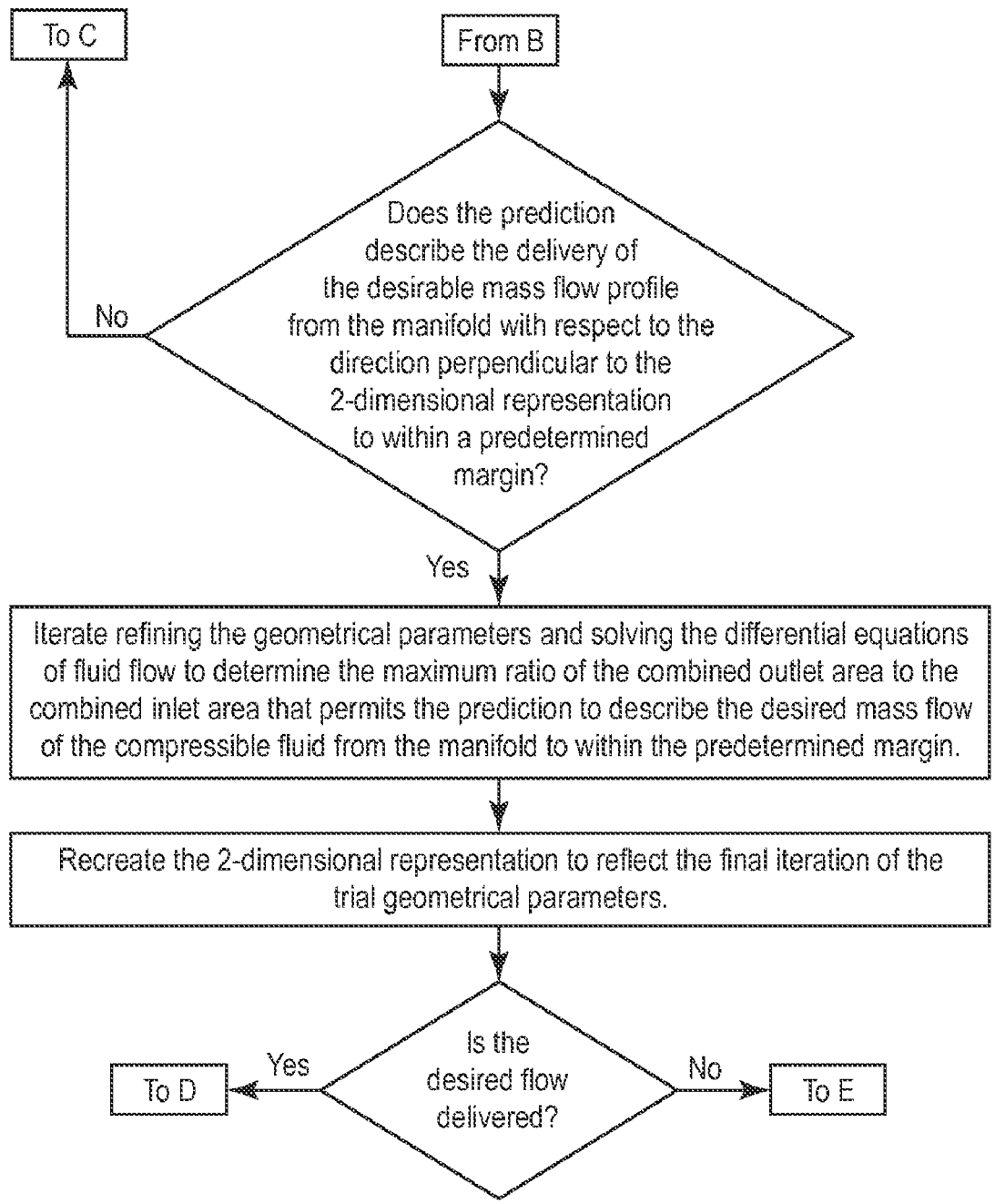

To test this estimate for this particular meltblowing situation, a real manifold was fabricated from metal according to the parameters that generated FIG. 8, and this manifold was installed in a meltblowing line according to the direction and positions identified in the 2-D analysis as illustrated in FIG. 4. The manifold was pressurized to 20 psig total at both ends, and fabric was made. It was observed that the unwanted accumulation of filaments on the surface of the die and the ducts is arrested, and the properties of the fabric were not adversely affected.

A caveat is appropriate to note concerning the step of reducing the ratio of the combined outlet area to the combined inlet area of the manifold when needful to achieve the necessary degree of uniformity of output along the length of the manifold. Heedlessly reducing the ratio more than necessary tends to give rise to other difficulties, particularly difficulties related to the amount of pressure needed to drive the mass flow. Higher pressures are more costly to achieve with respect to providing a suitable compressor or blower to supply the manifold 62, and higher pressures may require that the manifold 62 be constructed out of more expensive materials in order to withstand the stresses of pressurization.

In fact, in some circumstances it may prove difficult in iterating the geometrical parameters in the three-dimensional model so as to achieve the target mass flow rate, and the target distribution of flow along the length of the manifold, within the limitations of the equipment one hoped to use. When this has occurred, an optional step may be performed. The maximum mass flow rate the desirable equipment can provide with the needed level of uniformity along the length of the manifold is noted, and the 2-dimensional representation is reconstructed with that level of mass flow rate. Then the parameters of the exact position and dispensing direction of the manifold can be iterated and reanalyzed, seeking a combination where the manifold's maximum output of mass flow while retaining the target distribution of flow is sufficient to achieve the goal previously set for the desired mass flow profile, e.g. in the present example the isolation of the recirculation zone. It will be understood that it will sometimes be impossible to achieve some mass flow profiles involving combinations of mass flow and distribution of flow for some combinations of manifold geometry and gas supply equipment. It will further be understood that some configurations that the method allows as being suitable for the desired dispensing will be unsuitable for having sufficient structural strength for containing the internal pressure or for spanning the distance between supports when emplaced. It is contemplated that requirements for suction manifolds that evacuate, rather than dispense fluid, are suitable for treatment by the method of the present invention.

While the invention has been particularly shown and described with reference to various embodiments thereof, it will be understood by those skilled in the art that various other changes in the form and details may be made therein without departing from the spirit and scope of the invention.

What is claimed is:

1. A manifold for delivering a gas, the manifold comprising:
   an elongated, straight, cylindrical tube having a constant diameter and at least one inlet, an axis and a length greater than 60 cm;
   a series of slots in the wall of the tube, all having the same shape and size, spaced along the length of the tube and oriented lengthwise along a line parallel to the axis of the tube, the slots having a shape, size and wall thickness such that, when gas under a predetermined pressure flows into the inlet or inlets, the combination of slot size, spacing between slots and number of slots in the series of slots, wall thickness and the ratio of total outlet area of the slots to total inlet area provides a substantially uniform distribution of mass flow through the slots in a direction substantially perpendicular to the axis of the tube sufficient to generate an even curtain wall of gas, in which the size of the slots is determined by means of a three dimensional mathematical representation utilizing the k-epsilon two-equation model of the gas flowing through the manifold which includes the solution domain of the exhausted gas emanating from the manifold including the volume of gas adjacent the outside surface of the manifold covering one-fourth of the manifold perimeter on both sides of the series of slots.

2. A manifold for delivering a gas the manifold comprising:

an elongated, straight, cylindrical tube having a constant diameter and at least one inlet, an axis and a length greater than 60 cm;

a series of slots in the wall of the tube, all having the same shape and size, spaced along the length of the tube and oriented lengthwise along a line parallel to the axis of the tube, the slots having a shape, size and wall thickness such that, when gas under a predetermined pressure flows into the inlet or inlets, the combination of slot size, spacing between slots and number of slots in the series of slots, wall thickness and the ratio of total outlet area of the slots to total inlet area provides a substantially uniform distribution of mass flow through the slots in a direction substantially perpendicular to the axis of the tube sufficient to generate an even curtain wall of gas, in which the ratio of total outlet area of the slots to total inlet area of the manifold is no more than 0.9.

* * * * *